United States Patent
Lewis et al.

(10) Patent No.: US 8,326,228 B2
(45) Date of Patent: Dec. 4, 2012

(54) HEADSET LOCATOR DEVICE

(75) Inventors: John Lewis, Lawrenceville, GA (US);
Justin McNamara, Atlanta, GA (US);
Fulvio Cenciarelli, Suwanee, GA (US);
Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 805 days.

(21) Appl. No.: 12/339,298

(22) Filed: Dec. 19, 2008

(65) Prior Publication Data

US 2010/0159833 A1      Jun. 24, 2010

(51) Int. Cl.
*H04B 17/00*      (2006.01)

(52) U.S. Cl. ............... 455/67.11; 455/151.1; 455/226.1; 455/226.3; 455/272

(58) Field of Classification Search ............... 445/67.11, 445/151.1, 226.1, 226.3, 272, 434, 440
See application file for complete search history.

(56) References Cited

U.S. PATENT DOCUMENTS

| | | | | |
|---|---|---|---|---|
| 5,983,100 | A * | 11/1999 | Johansson et al. | 455/426.1 |
| 6,947,773 | B2 * | 9/2005 | Novorita et al. | 455/570 |
| 8,068,925 | B2 * | 11/2011 | McKillop et al. | 700/94 |
| 2004/0203895 | A1 * | 10/2004 | Balasuriya | 455/456.1 |
| 2005/0130593 | A1 * | 6/2005 | Michalak | 455/66.1 |
| 2005/0227724 | A1 * | 10/2005 | Tsai | 455/525 |
| 2006/0046709 | A1 * | 3/2006 | Krumm et al. | 455/422.1 |
| 2006/0199534 | A1 | 9/2006 | Smith | |
| 2008/0242220 | A1 * | 10/2008 | Wilson et al. | 455/3.04 |
| 2008/0298613 | A1 * | 12/2008 | Slamka et al. | 381/311 |
| 2009/0270093 | A1 * | 10/2009 | Lee | 455/434 |
| 2010/0159840 | A1 * | 6/2010 | Rosener et al. | 455/67.11 |

OTHER PUBLICATIONS

U.S. Appl. No. 11/924,140, filed Oct. 25, 2007 by Causey, Mark Edward, et al.

* cited by examiner

*Primary Examiner* — Linh Nguyen
(74) *Attorney, Agent, or Firm* — Woodcock Washburn LLP (57) ABSTRACT

A mobile telephone may aid a user in locating a lost wireless headset. The mobile telephone may include a processor and a user interface. The processor may receive data indicative of a quality (e.g., wireless signal strength) related to a proximity between the mobile telephone and the wireless headset. The processor may determine the proximity of the wireless headset to the mobile device. For example, the processor may compare the data to a reference value, such as one based on a transmit class (e.g., BLUETOOTH class) protocol in use between the mobile telephone and the wireless headset. The processor may correlate relative position data to determine a direction to the wireless headset. The processor indicate a distance and/or direction to the user via the user interface and may selectively enable one of the wireless headset and an audio interface of the mobile telephone unit as a default device based on the relative proximity to the wireless headset.

18 Claims, 5 Drawing Sheets

HEADSET LOCATOR DEVICE

BACKGROUND

Mobile telephones are a part of everyday life. People place and receive mobile telephone calls practically everywhere and at all times of the day. The penetration rate of mobile telephone usage continues to increase.

A mobile telephone user may use a wireless headset. The wireless headset may provide a speaker, a microphone, and a cordless connection to the mobile telephone. Typically the wireless headset communicates with the mobile telephone via a cordless protocol such as BLUETOOTH™, for example.

The wireless headset may provide convenient hands-free operation of the mobile telephone. In some jurisdictions, use of a headset, such as a wireless headset, may be required when operating a motor vehicle and a mobile telephone at the same time.

Wireless headsets are generally small, low-power, low-functionality devices. The wireless headset may be small enough in size to fit over the user's ear, for example. The power consumption may be limited by the use of hardware components that provide a limited set of functions. For example, energy-efficient application specific integrated circuits (ASICs) may be used to provide audio processing and cordless protocol functionality.

Their small size and wireless design allow wireless headsets to be conveniently used and stored. However, wireless headsets may be misplaced and/or lost. Their small size and wireless design may make finding them difficult. Building significant features into the wireless headset itself to aid in their recovery may run counter to the size and power objectives.

SUMMARY

The disclosed system may aid a user in locating a lost communications device, such as a wireless headset. A mobile telephone may be adapted to communicate with the wireless headset. The mobile telephone may include a processor and a user interface. The processor may receive data indicative of a quality (e.g., wireless signal strength and audio feedback level) related to a proximity between the mobile telephone and the wireless headset. For example, the processor may receive data from a sensor that senses the quality. The processor may indicate a result to the user via the user interface.

The processor may compare the sensed quality to a reference value. For example, the reference value may be based on a transmit class (e.g., BLUETOOTH class) in use between the mobile telephone and the wireless headset.

The processor may correlate relative position data (from an accelerometer, digital compass, or the like) with the sensed quality. Thus, the processor may indicate to the user a direction (such as a multidimensional direction) associated with the greatest sensed quality, such as greatest signal strength and/or audio feedback level. The processor may indicate this direction to the user as an estimate of the direction to the wireless headset.

The processor may selectively enable one of the wireless headset and an audio interface of the mobile telephone unit as a default device. The processor may make this selection based on the relative proximity to the wireless headset. Thus, a user may have the wireless headset set as a default device if it is relatively close to the mobile telephone and may have the mobile telephone set as the default device if the wireless headset is relatively far away (such as in another room for example).

DETAILED DESCRIPTION OF ILLUSTRATIVE EMBODIMENTS

In the disclosed system, there may be two or more wireless devices. The wireless devices may communicate with each other, and one device may be able to locate the other device. To illustrate, one device may include a mobile, wireless telephone handset. The other device may include a wireless headset, such as a BLUETOOTH headset for example. It's not uncommon for mobile telephone users to lose or misplace their wireless headsets. When the wireless headset is lost, the user may use the mobile telephone to locate the wireless headset. The mobile telephone may detect and present to the user an indication of distance and/or direction to the wireless headset.

For example, the mobile telephone may measure a received signal strength of the cordless protocol and/or a level of audio feedback between the mobile telephone and the wireless headset. This measurement may provide a general proximity and/or distance between the mobile telephone and the wireless headset. The mobile telephone may record relative orientation data (such as that provided by a digital compass, an accelerometer, or the like) in connection with the first measurement. The mobile telephone may consider which direction provides the greatest result of the first measurement, providing an indication of direction to the wireless headset. Thus, the user may walk about holding the mobile telephone, sensing proximity and/or direction to the wireless headset until the wireless headset is found.

Moreover, the proximity between the mobile telephone and the wireless headset may be used to set certain default settings on the mobile telephone. For example, when the mobile telephone and the wireless headset are in close proximity, the mobile telephone may set the wireless headset as the default device used when answering a telephone call. Likewise, when the mobile telephone and the wireless headset are not in close proximity, the mobile telephone may set the mobile telephone handset, itself, as the default device used when answering a telephone call.

The disclosed system may include devices, such as electronic devices. Any of the devices may be a communications device, such as a mobile telephone, a personal digital assistant (PDA), a laptop computer, a wireless headset, or the like. The devices may include wireless headsets, MP3 players, voice recorders, calculators, etc.

The mobile telephone may be any device suitable for communicating with a mobile communications network, such as the Global System for Mobile communication (GSM), General Packet Radio Service (GPRS), Universal Mobile Telephone System (UMTS), High Speed Packet Data Access (HSPDA), CDMA2000 1x Evolution Data Optimized (EVDO), Enhanced Data GSM Environment (EDGE), and the like.

GSM provides circuit-switched data services to subscribers, such as mobile telephone or computer users, for example. GPRS, which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

In the disclosed system two devices may communicate with each other. For example, the devices may communicate with each other via a radio frequency (RF) protocol. The RF protocol may be a cordless protocol. For example, the cordless protocol may include BLUETOOTH protocol, Digital Enhanced Cordless Telecommunications (DECT) protocol, wireless Universal Serial Bus (USB) protocol, near field communication protocol, Zig-Bee low-power light-weight wireless protocol, wireless network protocols such as Wi-Fi (IEEE 802.11) and WiMAX (IEEE 802.16) for example, or the like.

The communications channel may include the 2.4 GHz RF bandwidth, 1.88 to 1.9 GHz RF bandwidth, 1.92 to 1.93 GHz RF bandwidth, or any other suitable communications channel. The communications channel may include a DECT channel via a generic access profile (GAP) platform. The BLUETOOTH protocol may use the 2.4 GHz RF range. The BLUETOOTH headset may establish a personal area network (PAN) between the two devices. The BLUETOOTH channel may use frequency hopping spread spectrum technology and Gaussian frequency shift keying (GFSK) for example.

The BLUETOOTH protocol may include BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

In BLUETOOTH communications, a channel class may be established. For example, Class I may include a 100 mW (20 dBm) maximum permitted power. A Class I device may have an approximate range of 100M, for example. Class II may include 2.5 mW (4 dBm) maximum permitted power. A class II device may include a range of about 10M, for example. Class III may have a 1 mW (0 dBm) maximum permitted power. A class III device may include a range of about 1M. The BLUETOOTH channel may include an exchange of information indicative of the operating class for each device.

Figure 1A:
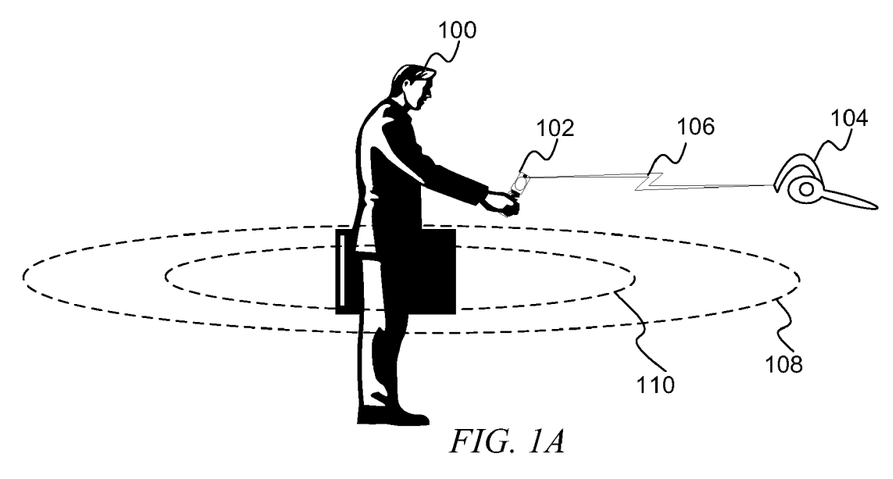
FIGS. 1A & 1B depict an example scenario for locating a device.
Figure 1B:
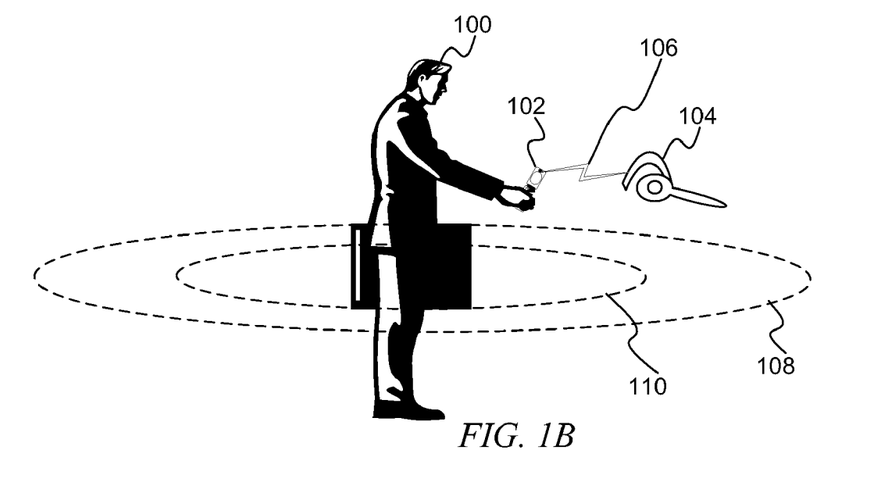

FIGS. 1A & 1B depict an example scenario for locating a device. The locating device may detect relative proximity and/or distance.

A user 100 may operate a first device 102 to locate a second device 104. The first device 102 may be in wireless communication with the second device 104. The wireless communication may include the BLUETOOTH protocol, for example.

The second device 104 may be a first distance 108 away from the first device 102, as illustrated in FIG. 1A. User may direct the first device 102 to locate the second device 104. The first device may measure the received signal strength of a wireless signal 106. As the user walks around looking for the second device, the received signal strength may be measured over time. When the second device 104 is a second distance 110 away, as illustrated in FIG. 1B, the received signal strength will be greater than when the second device is the first distance 108 away. The first device 104 may indicate the relative proximity between the first device 102 and the second device 104 in accordance with changes in the received signal strength of the wireless signal 106. The increase is received signal strength may indicate to the user that the user is getting closer to finding the second device 104. This information may eliminate many areas, such as rooms of a house, a car, or an office, so the search may be concentrated to a particular area.

The first device 102 may compare the received signal strength of the wireless signal 106 to a reference signal strength level. For example, the first device and second device may include a calibration mode, where the user places the two devices at a known distance apart and makes a measurement to determine a reference signal strength level.

The first device 102 may exchanges class information with the second device 104. Having exchanged class information, the first device 102 may compare the received signal strength of the wireless signal 106 to a reference signal strength level. For example, if the second device 104 is a Class II BLUETOOTH device, the first device 102 may compare the received signal strength with a reference signal strength associated with a Class II device. The first device 102 may use the comparison to determine a distance between the first device 102 and the second device 104. For example, a received signal measured at 2.5 mW may indicate that a Class II second device 103 is relatively close to the first device. A received signal measured at 2.5 mW may indicate that a class I device is much further away.

The second device 104 may send data indicative of a transmit signal strength to the first device 102. For example, if the second device 104 reduces transmit power (e.g., entering a power save mode), the second device 104 may send the new transmit power level to the first device 102.

The reference signal strength level may be associated with an estimated distance. The reference signal strength level may be used in connection with a path loss determination to estimate the distance between the first device 102 and the second device 104. Path loss refers to the reduction in signal power associated with the distance between the two wireless devices. The path loss determination may include modeled, predicted, statistical and/or deterministic methods. For example, predicted path loss may use a path loss db equation, such as $L=10n \log 10(d)+C$, where L is the path loss in decibels, n is the path loss exponent (such as 4), d is the distance between the transmitter and the receiver, and C is a constant which accounts for system losses. Statistical methods may be based on measured and averaged losses along typical classes of radio links, such as the COST-231, Okumura-Hata, W. C. Y. Lee, etc. Deterministic methods may be based on wave propagation.

The result of this comparison may include an estimate of the distance between the first device 102 and the second device 104. This estimate may be presented to the user over time. Thus, as the user gets closer to the second device, the decrease in distance may be shown in the estimate.

Audio feedback may be used to determine a relative proximity and/or distance to between the first device 102 and the second device 104. When the user directs to the first device 102 to locate the second device 104, the first device 102 may direct the second device 104 to open a microphone and transmit the received sound to the first device 102. The first device 102 may play the received signal to a speaker. The signal from the speaker of the first device 102 may be received by the microphone of the second device 104 causing a feedback loop. The first device 102 may sound a seed tone to begin the audio feedback process.

The first device 102 may open a microphone and transmit a signal indicative of the audio from the microphone to the second device 104. The first device 102 may direct the second device 104 to play that received audio to a speaker. The audio from the speaker of the second device 104 may be received by the first device 102, creating the audio feedback loop. The second device 104 may sound a seed tone to begin the audio feedback process.

The first device 102 and/or the second device 104 may measure a level of audio feedback received which will increase as the proximity to the second device 104 increases. The second device may send data indicative of the measurement of audio feedback to the first device 102. The measure of audio feedback may be a value associated with the loudness of the audio feedback. For example, the loudness of the audio feedback may be measured in decibels. The measured value may be used to determine a relative proximity between the first device 102 and the second device 104. To illustrate, the measured audio feedback may be greater when the first device 102 and the second device 104 are separated by the second distance 110 than when they are separated by the first distance 108.

Similarly, the measured audio feedback may be compared to reference level and/or an processed according to an acoustical loss determination to estimate distance. The system may include a predefined reference value associated with the receive sensitivity of the microphone and the power of the speaker. The first device and second device may include a calibration mode, where the user places the two devices at a known distance apart and makes a measurement to define the reference level.

Figure 2A:
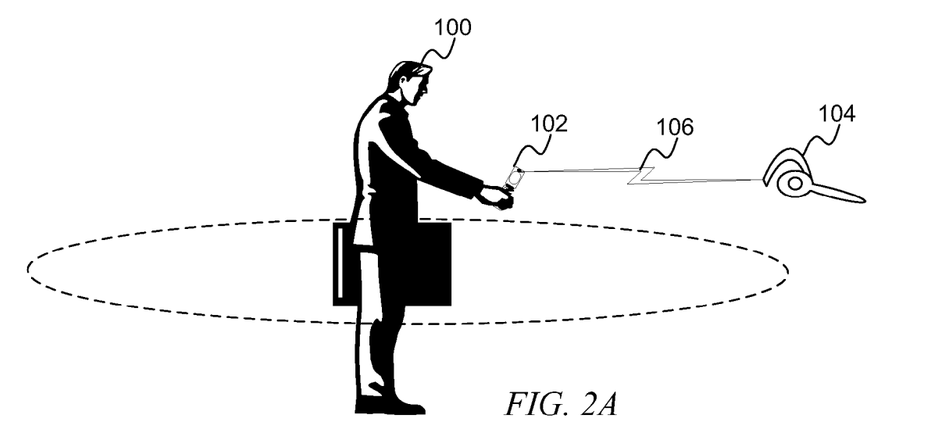
FIGS. 2A & 2B depict an example scenario for locating a device.
Figure 2B:
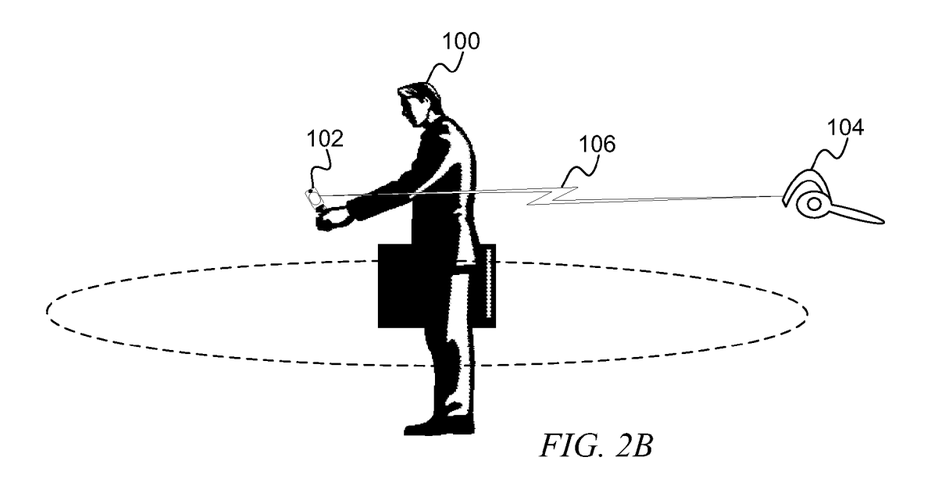

FIGS. 2A and 2B depict an example location scenario. The first device 102 may determine a direction to the second device 104. The first device 102 may include a sensor to sense relative and/or fixed direction. This information may be correlated with data about the received signal strength. The first device 102 may indicate to the user 100 a direction that corresponds to the greatest received signal strength. Thus, as the user 100 move around looking for the second device 104, the first device 102 may aid in finding the second device by indicating a direction to the second device 104.

For example, the first device 102 may include an accelerometer to measure relative direction. An accelerometer may include a device used for measuring acceleration and gravity induced forces. The accelerometer may include a small micro-electro-mechanical system (MEMS). The first device 102 may include a digital compass. The digital compass may include a solid state device suitable for measuring direction relative to magnetic north.

The relative direction may include an angular direction within a plane that is coplanar with the ground. The relative direction may include a multidimensional direction. For example, the direction may include an angular direction referenced perpendicular to a plane that is coplanar to the ground. The relative direction may include a combination of angles. The relative direction may be expressed in Euclidian coordinates, polar coordinates, spherical coordinates, or the like.

The user may direct the first device 102 to help locate the second device 104. The first device 102 may begin to record both signal strength data and/or relative direction data. The first device 102 may indicate to the user to hold the first device at arms length and rotate in a standing position 360°, for example.

The first device 102 may exploit that the shortest line between the handheld first device 102 and the second device 104, as illustrated in FIG. 2A, may represent the strongest signal strength. Likewise, when the line of sight between the first device 102 and the second device 104 is fully blocked by the body of the user 100, as shown in FIG. 2B, the relative received signal strength may be at a minimum.

The human body may be made up of about 70% water. This water may attenuate RF signals. The attenuation caused by the human body may, in the 2.4 GHz range for example, be about 3 dB. Thus, there may be at least a 3 dB difference between the direct line of sight orientation, as illustrated in FIG. 2A, and the fully blocked orientation, as illustrated in FIG. 2B. This difference may be noted by the measurement of received signal strength. The first device may correlate this difference with the change in direction (as measured by the accelerometer or digital compass, for example).

The first device 102 may display to the user 100 a direction to the second device 104. For example, the first device 102 may indicate a portion of an arc associated with the strongest received signal strength. The first device 102 may provide directional information to the user, such as a fixed bearing, directional arrow, a map, or the like.

Figure 3A:
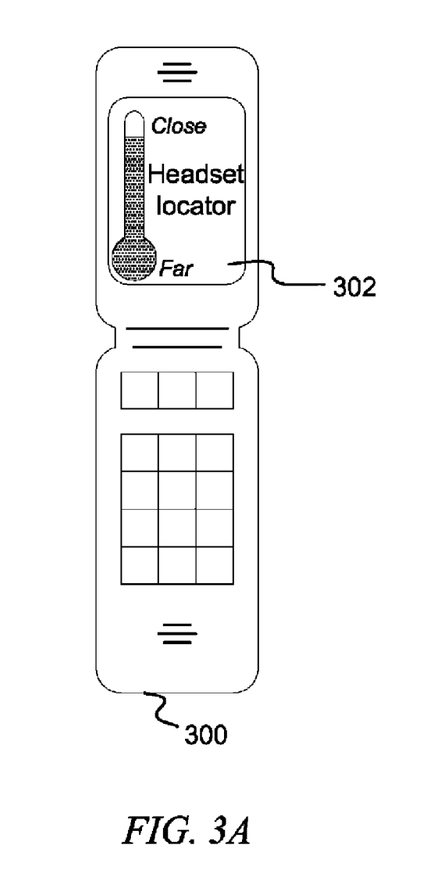
FIGS. 3A-C depict example user interface displays for a locating device.
Figure 3B:
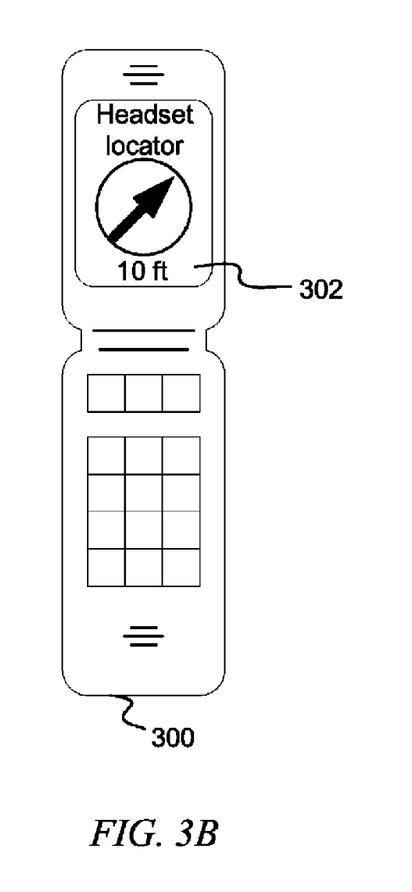
Figure 3C:
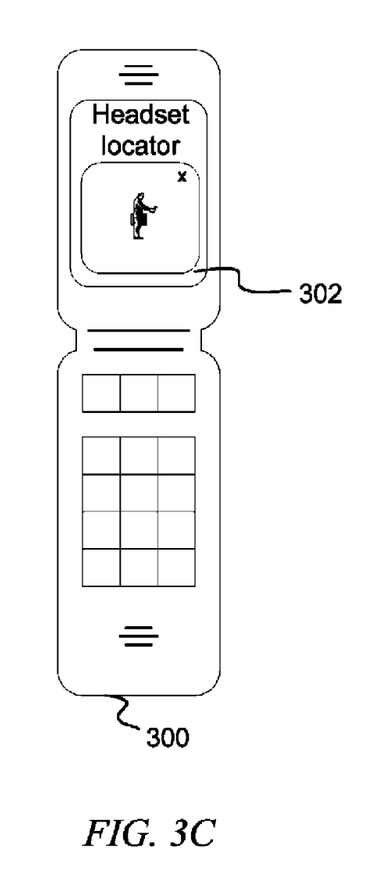

FIGS. 3A-C. depict example user interface displays for locating a device. A mobile telephone 300 may include a display 302. The display 302 may provide an indication of the relative proximity and/or distance and/or direction between the mobile telephone 300 and another device, such as a wireless headset, for example.

As illustrated in FIG. 3A, the mobile telephone 300 may present a "hot versus cold" indication of relative proximity. For example, the display 302 may include a representation of a thermometer with a mercury level in accordance with the relative proximity to the wireless headset. When the mobile telephone 300 is further away from the wireless headset, the mobile telephone may indicate that the user is "cold." Similarly, as the user gets closer to the wireless headset and the signal strength increases, the mobile telephone 300 may indicate the increasing relative proximity to the wireless headset by indicating that the user is "hot."

As illustrated in FIG. 3B, the mobile telephone 300 may present an arrow. The arrow may indicate a direction that corresponds to the greatest level in received signal strength. The mobile telephone 300 may identify a direction associated with the greatest signal strength. The mobile telephone 300 may update the graphical representation of the arrow to indicate the direction associated with the greatest signal strength.

The display 302 may include a numerical value that estimates the distance to the wireless headset. The mobile telephone 300 may consider the received signal strength in light of a reference value (such as a reference value associated with the class of wireless headset). The mobile telephone 300 may consider the difference between the received signal strength and the reference signal strength to determine an estimation of the distance between the mobile telephone 300 and the wireless headset.

As illustrated in FIG. 3C, the display 302 may include a map that indicates relative proximity and direction between the mobile telephone 300 and the wireless headset. The user and mobile telephone may be depicted at the center of the map. The wireless headset may appear as an "x." As the user becomes closer to the wireless headset, the "x" may move closer to the center of the map. Similarly, position of the "x" relative to the top of the display may indicate the direction to the wireless headset. For example, a user who is facing the last wireless headset and is holding the mobile telephone 300 in front of him may see the "x" at the top of the display 302. Likewise, a user who is facing away from the last wireless headset and is holding the mobile telephone 300 in front of him may see the "x" at the bottom of the display 302.

Figure 4:
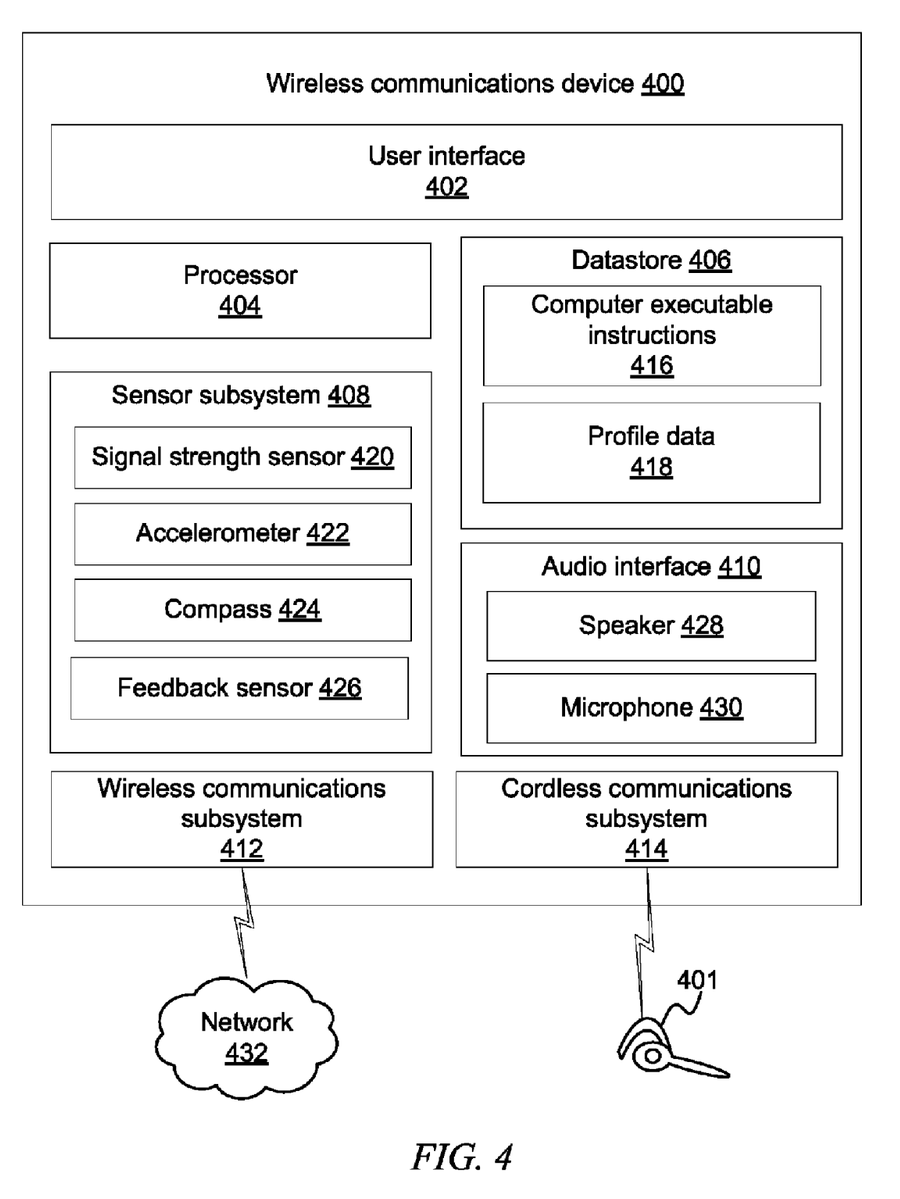
FIG. 4 is a block diagram of an example locating device.

FIG. 4 is a block diagram of an example locating device. For example, the device may be a wireless communications device 400. A wireless headset 401 may be in communication with the wireless communication device 400 via a cordless communications protocol. The wireless communications device 400 may be any electronic device suitable for providing wireless communications. For example, the wireless communications device 400 may include a mobile telephone, a personal digital assistant (PDA), a wireless enabled laptop computer, a text messaging device, a wireless token, and the like. The wireless communication device 400 may include a user interface 402, a processor 404, a data store 406, a sensor subsystem 408, an audio interface 410, a wireless communications subsystem 412, and a cordless communications subsystem 414.

The user interface 402 may be any component suitable for presenting information to and receiving information from a user. The user interface 402 may include a display for presenting a visual representation to a user. For example, the display may be a liquid crystal display (LCD). The display may be a touch screen display. The display may be a light emitting diode (LED) display. The display may be suitable for presenting text and/or images to the user. The user interface 402 may include a user input device. The user input device may include a hard button, a soft button (i.e., with its function defined by a representation on the display), a keyboard, a roller device, a trackball, and the like.

The processor 404 may include any device, component, system, subsystem, or the like suitable for processing data. The processor 404 may include a microprocessor, a microcontroller, an application-specific integrated circuit (ASIC), a field programmable gate array, or the like. The processor 404 may be suitable for receiving data from the user via the user interface 402, the sensor subsystem 408, the wireless communication subsystem 412, and the cordless communications subsystem 414. The processor 404 may store data in the datastore 406. The processor may direct the operation of the user interface 402 and/or the audio interface 410. The processor may communicate via the wireless communications subsystem 412 and/or the cordless communications subsystem 414.

The sensor subsystem 408 may sense a quality indicative of a proximity and/or direction to the wireless headset. The sensor subsystem 408 may send data indicative of that quality to the processor 404. For example, the data may include a value indicative of distance and/or direction, a signal strength level, an audio feedback level, or the like. The sensor subsystem 408 may send direction data that represents a present orientation of the wireless communications device 400.

The sensor subsystem may include a signal strength sensor 420, accelerometer 422, a digital compass 424, an audio feedback sensor 426, and/or the like. The signal strength sensor 420 may receive information from the cordless communications subsystem 414 to determine the signal strength of a received signal from the wireless headset. The signal strength sensor 420 may be a component of the cordless communications subsystem 414. For example, the signal strength sensor 420 may be incorporated in a transceiver unit of the cordless communications subsystem 414. The signal strength sensor 420 may be a processing circuit that receives information from the cordless communications subsystem 414 indicative of signal strength.

The accelerometer 422 may include any device, component, system, and/or subsystem suitable for measuring acceleration. The output of the accelerometer 422 may be integrated to determine relative distance and/or position. For example, the accelerometer 422 may be used to determine a relative direction associated with a user turning around while holding the wireless communications device 400.

The digital compass 424 may measure the direction in which the wireless communications device is pointing. The digital compass 424 may determine direction of the wireless communications device 400 relative to the earth's magnetic poles. The digital compass 424 may be a magnetically sensitive device able to indicate the direction of the magnetic north. The digital compass 424 may include a solid state compass. The digital compass 424 may include magnetic field sensors.

The audio feedback sensor 426 may measure a level of audio feedback. The audio feedback sensor 426 may be in communication with the audio interface 410. The audio feedback sensor 426 may measure a level of audio feedback received at the audio interface 410.

The audio feedback sensor 426 may be in communications with the cordless communications subsystem 414 and may measure a level of audio feedback as received by a wireless headset 401 in communication with the cordless communications subsystem 414. A measure of audio feedback may be a value associated with the loudness of the audio feedback. For example, the loudness of the audio feedback may be measured in decibels.

To illustrate, the processor 404 may direct the wireless headset 401 to open an audio channel and communicate that data back to the wireless communications device 400. The processor 404 may direct the audio information to be played out of a speaker 428, generating a feedback loop. The audio feedback sensor 426 may measure the loudness of the audio feedback.

The audio interface 410 may include the speaker 428 and/or a microphone 430. The speaker 428 may include any hardware suitable for generating an audible sound. The microphone 430 may include any hardware suitable for receiving an audible sound and generating a corresponding electrical signal. For example, the speaker 428 and microphone 430 may be used for a telephone conversation with the wireless communications device 400. The microphone 430 may pick up audible voice information from a user and communicate that information via the wireless communication subsystem 412 to a wireless network 432. Similarly, sound information from another party of the telephone call may be received from the wireless network 432 via the wireless communication subsystem 412 and played out to the user via the speaker 428.

The data store 406 may include any device, component, system, and/or subsystem suitable for storing data. The datastore 406 may include volatile and/or nonvolatile memory. The datastore may include Random Access Memory (RAM), Read Only Memory (ROM), flash memory, magnetic disk memory, optical storage memory, and/or the like. The data store may have stored therein computer executable instructions 416 and/or profile data 418.

Computer executable instructions 416 may include computer readable code that when executed by the processor caused the wireless communications device 400 to perform certain steps or actions described herein. Computer executable instructions may include machine code, byte code, script language, runtime code, or the like. The computer executable instructions for example when executed by the processor may cause the processor to perform the method described in FIG. 5.

Profile data 418 may include information describing the operating environment for the wireless communications device 400 and the wireless headset. The profile data 418 may include pairing data associated with a BLUETOOTH protocol connection established between the wireless communication device 400 and the wireless headset 401. Profile data 418 may include the class of BLUETOOTH device associated with the wireless headset 401.

The profile data 418 may include one or more reference values associated with determining the proximity between the wireless communications device 400 and the wireless headset 401. For example the profile data 418 may include a reference signal strength and/or a reference audio feedback level to which the corresponding measured quantity may be compared. The reference signal strength may be associated with a class of BLUETOOTH device and may be indicative of an empirical relationship between relative distance and signal strength of a device that class.

The cordless communication subsystem 414 may include any hardware, software, firmware, and/or the like suitable for establishing and maintaining communications between the wireless communications device 400 and another wireless communications device, such as a wireless headset 401. The cordless communications subsystem 414 may include functionality to provide communications over a short-haul distance. For example, the cordless communications subsystem 414 may operate a BLUETOOTH protocol stack.

The wireless communication subsystem 412 may include any hardware, software, firmware and/or the like suitable for providing connectivity between the wireless communications device 400 and the wireless network 432. For example, the wireless network 432 may include a GSM network and the wireless communication subsystem 412 may provide support for the GSM protocol. The wireless communication subsystem 412 may include a Subscriber Identity Module (SIM) card. The SIM card may provide identification of the wireless communications device 400 to the wireless network 432.

In operation, the processor 404 may determine a proximity, distance, and/or direction to the wireless headset 401. The processor 404 may receive an indication from the user interface 402 that the user intends to find the wireless headset 401. For example, the processor may receive from a button press or a indication on touchscreen that the user intends to locate the wireless headset 401. The processor may engage the sensor subsystem 408. The processor 404 may receive data from the sensor subsystem 408. The processor 404 may engage profile data 418 stored at the datastore 406 and compare a reference value stored in the profile data 418 with the data received from the sensor subsystem 408 to determine a proximity, distance, and/or direction to the wireless headset 401.

The processor may direct a display of the user interface 402 to present a result. For example, the processor 404 may direct the user interface 402 to indicate how close or how far away the wireless headset 401 is from the wireless communications device 400. The processor 404 may direct the user interface 402 to display textual and/or graphical representation indicative of the proximity, distance, and/or direction to the wireless headset 401

Moreover, the processor 404 may selectively enable one of the audio interface 410 or the wireless headset 410 based on the determined proximity. For example, if the proximity is within a distance that suggests that the user recognizes that his wireless headset is nearby, then the processor 404 may selectively enable the wireless headset 410 as a default device for communications via the wireless communications device 400. Thus, if the wireless communications device 400 receives an incoming telephone call, the wireless headset 401 will be the default device for taking the call. Likewise, if the processor 404 determines that the wireless headset 401 is far enough away that a user would not likely consider it nearby enough for answering a telephone call, the processor 404 may selectively enable the local audio interface 410 as the default device To illustrate, if the wireless headset 401 is more than 10 feet away, for example, the processor 404 may selectively enable the audio interface 410 as the default. Ten feet is purely an example. The threshold value may be set according to user preferences or according to a network standard. The processor 404 may have a configurable threshold value. The threshold value may be stored in the datastore 406. The processor 404 set the threshold value based on a historic tracking of user selection and wireless headset proximity. Thus, if the user continuously selects the audio interface 410 for communications when the wireless headset 401 is more than 4 feet away, the processor 404 may set the threshold value to 4 feet, for example.

Figure 5:
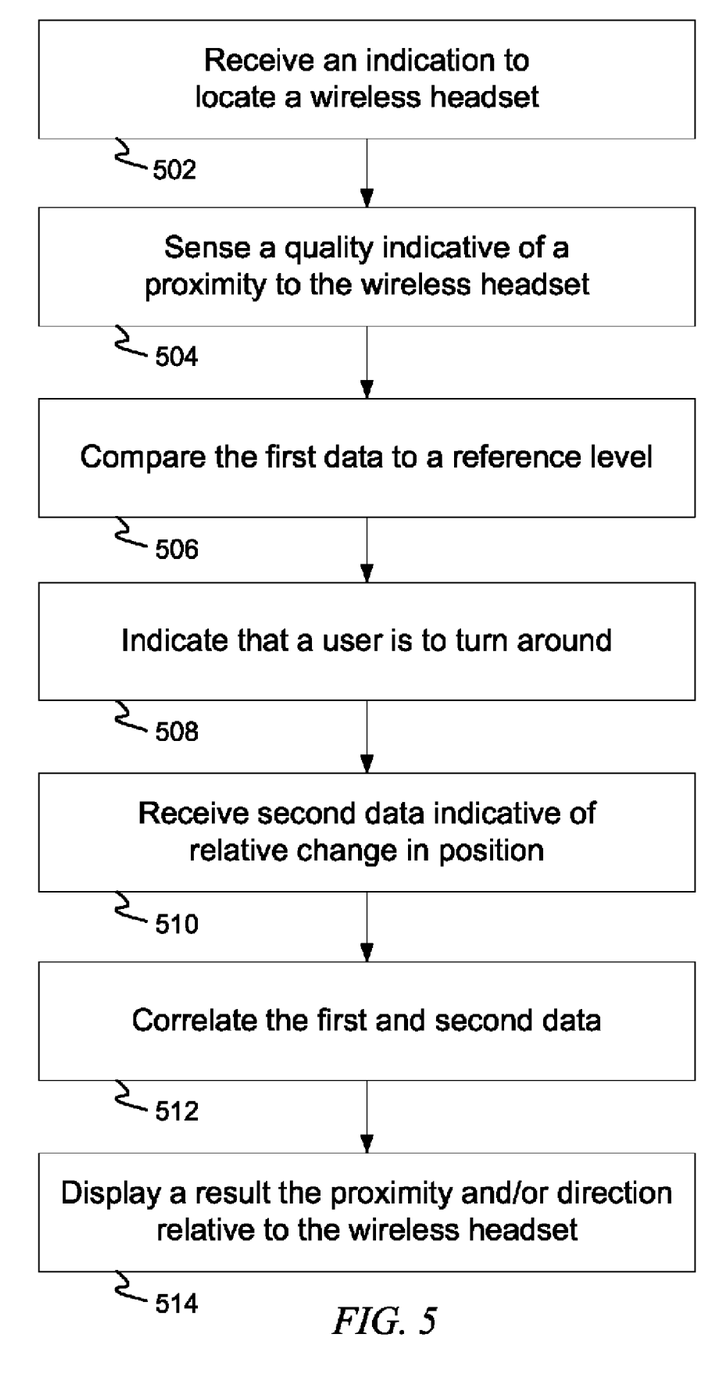
FIG. 5 is a flow diagram of an example locating process.

FIG. 5 is a flow diagram of an example locating process. At 502, an indication to locate a wireless headset may be received. The indication may be presented by a user of a wireless communications device. The user may have lost his wireless headset and wishes to locate it. The user may indicate to the wireless communications device that he or she wishes to locate the wireless headset by pressing a button, clicking an icon, touching a portion of the display, providing a voice command, or the like.

At 504, a quality indicative of the proximity and/or distance to the wireless headset may be sensed. For example, the relative signal strength of an RF signal received from the wireless headset may be sensed. Also for example, audio feedback developed between the wireless headset and the handset may be sensed. The strength of the received signal and/or audio feedback may be indicative of the proximity to the wireless headset. A strong received signal and/or a loud received audio feedback may be indicative of a close proximity to the wireless headset. Likewise a weak received signal and/or a soft audio feedback may be indicative of a relatively distant proximity to the wireless headset.

At 506, data indicative of the quality sensed at step 504 may be compared to a reference level. For example, the reference level may include a baseline received power expectation. The baseline received power expectation may be based on the class of device sending the signal. For example, the baseline expectation may be based on a BLUETOOTH class. Similarly, the reference level may include a baseline expectation of loudness associated with a received audio feedback level.

The reference level may be predetermined. The reference level may be determined empirically by the user and configured. For example, the user may calibrate the reference level by setting the wireless headset and the handset at a known distance apart and running a test procedure to establish a baseline expectation of received power and/or receive loudness of a feedback signal. Thus, the comparison between the data indicative of the sensed quality and the reference level may further refine the relative proximity to the wireless handset.

At 508, the display may indicate to the user to turn around. Here, the user by turning his or her body in a 360° rotation, may alter the received signal strength as a function of the angle of his or her body relative to the handset and relative to the wireless headset. When the user is facing the wireless headset, there will be a short path between the wireless handset being held in front of the user and the wireless headset. In contrast, when the user is facing away from the wireless headset there will be a long path between the hand set and the wireless headset. The user's body will be between the handset and the wireless headset. Accordingly, the received signal strength will be its greatest when the user is facing the wireless headset and will be its weakest when the user is facing away from the wireless headset. Thus, an indication of the relative direction to the wireless headset may be determined.

At 510, second data indicative of a relative change in position may be received. The second data may be determined by a device suitable for measuring a relative change in direction. For example, the second data may be provided by an accelerometer, digital compass, or the like. The second data may be correlated with the first data, at 512. The second data and the first data being correlated may relate signal strength as a function of position and/or angle. The wireless headset display may display a result that includes the proximity and/or direction to the wireless headset, at 514. The display may include an arrow or a mapping indicating to the user the relative position of the wireless headset, thus, making locating the wireless headset easier for the user.

What is claimed:

1. A mobile device comprising:
   a processor configured to determine a proximity of a wireless headset to the mobile device based on first data, received by the processor, that is indicative of a quality of communication between the mobile device and the wireless headset, wherein the quality comprises audio feedback produced between the mobile device and the wireless headset, wherein a level of the audio feedback increases as the proximity increases; and
   a user interface configured to present a representation of the proximity.

2. The device of claim 1, wherein the quality includes wireless signal strength of a signal from the wireless headset.

3. The device of claim 2, wherein the processor compares the first data to a reference level of signal strength to determine the proximity.

4. The device of claim 3, wherein the references level of signal strength is based on a transmit class of the wireless headset.

5. The device of claim 1, wherein the representation indicates whether the headset is getting closer to or farther away from the mobile device.

6. The device of claim 2, further comprising a position sensor in communication with the processor, wherein the processor is configured to receive, from the positions sensor, second data indicative of relative change in orientation of the mobile device, and wherein the processor is configured to correlate the first and second data to determine a direction between the mobile device and the wireless headset.

7. The device of claim 6, wherein the processor indicates, via the user interface, that mobile device be moved in an arc, wherein the representation include an indication towards the wireless headset.

8. The device of claim 1, wherein the processor generates a seed tone that develops the audio feedback between the mobile telephone and wireless headset.

9. The device of claim 1, wherein the mobile device defaults to a connected speaker and microphone or the wireless headset based on the proximity.

10. A method comprising:
    receiving, by a system comprising at least one device, an indication to locate a wireless headset;
    determining, by the system, a proximity to a first device based on a quality of communication with the wireless headset, wherein the quality comprises audio feedback produced between the first device and the wireless headset, wherein a level of the audio feedback increases as the proximity increases; and
    presenting, by the system, a representation of the proximity.

11. The method of claim 10, wherein the quality includes wireless signal strength of a signal from the wireless headset.

12. The method of claim 11, further comprising, by the system, comparing the wireless signal strength to a reference level of signal strength.

13. The method of claim 12, wherein the reference level of signal strength is based on a transmit class of the wireless headset.

14. The method of claim 10, wherein the representation indicates whether the proximity to the wireless headset is increasing or decreasing.

15. The method of claim 14, further comprising receiving, by the system, first data indicative of relative change in position, and correlating the first data with second data indicative of the quality of communication to determine a direction to the wireless headset.

16. The method of claim 15, further comprising indicating, by the system, that a mobile device be moved in an arc, wherein the representation includes an indication towards the wireless headset.

17. The method of claim 10, further comprising transmitting, by the system, a seed tone to develop the audio feedback.

18. A wireless mobile telephone comprising:
    an audio interface configured for local voice communication;
    a cordless communications subsystem configured to remote voice communication via a wireless headset; and
    a processor that determines a proximity to the wireless headset and selectively enables one of the audio interface or the cordless communication subsystem based on the proximity.

* * * * *